(12) United States Patent
Smith et al.

(10) Patent No.: US 9,860,388 B1
(45) Date of Patent: Jan. 2, 2018

(54) AUTOMATIC HANDSHAKING TO IMPROVE CALL PROCESSING AND PERFORMANCE

(71) Applicant: TYCO SAFETY PRODUCTS CANADA LTD., Concord (CA)

(72) Inventors: Derek C. Smith, Maple (CA); Stephane Foisy, Udora (CA)

(73) Assignee: TYCO SAFETY PRODUCTS CANADA LTD., Ontario (CA)

( * ) Notice: Subject to any disclaimer, the term of this patent is extended or adjusted under 35 U.S.C. 154(b) by 0 days.

(21) Appl. No.: 15/465,750

(22) Filed: Mar. 22, 2017

(51) Int. Cl.
*H04M 11/00* (2006.01)
*H04M 11/04* (2006.01)
*G08B 25/08* (2006.01)

(52) U.S. Cl.
CPC ............. *H04M 11/04* (2013.01); *G08B 25/08* (2013.01)

(58) Field of Classification Search
CPC ................................ H04M 11/04; G08B 25/08
See application file for complete search history.

(56) References Cited

U.S. PATENT DOCUMENTS

2008/0240372 A1* 10/2008 Frenette ............... G08B 25/004 379/40
2011/0298616 A1* 12/2011 Foisy ..................... G08B 29/06 340/540

* cited by examiner

*Primary Examiner* — Stella Woo (57) ABSTRACT

Techniques for a central monitoring station (CMS) of a monitoring system to establish communications with a remote alarm panel more quickly and efficiently are provided. A signal from a remote alarm panel can be received by the CMS. The CMS can identify the remote alarm panel based on information related to the received signal. The CMS can determine if the remote alarm panel is known or unknown based on any prior interaction with the remote alarm panel. The CMS can store information regarding known remote alarm panels from prior interactions. Handshake signals and data formatting information determined from prior interactions with the known remote alarm panel can be stored and used on subsequent calls. Additional operational information related to the remote alarm panel can also be updated after each call to further customize future interactions with the remote alarm panel.

18 Claims, 5 Drawing Sheets

| Phone # | Created | Last Use | Handshake | Format ID | Lock Handshake | Lock Format | Usage Counter |
|---|---|---|---|---|---|---|---|
| 9995500001 | 30/01/2017 9:51 AM | 06/03/2017 5:42 PM | 14 | 16-Contact ID (4-Digit Acco... | Disabled | Disabled | 75 |
| 9995500002 | 30/01/2017 9:51 AM | 06/03/2017 | OC | 68-SIA FSK Level 1, 2 and 3 | Enabled | Disabled | 73 |
| 9995500003 | 30/01/2017 9:52 AM | 06/03/2017 | 23 | 54-4/2 Pulse | Disabled | Enabled | 75 |
| 9995500004 | 30/01/2017 9:52 AM | 06/03/2017 5:43 PM | 14 | 16-Contact ID (4-Digit Acco... | Disabled | Disabled | 73 |
| 9995500005 | 30/01/2017 9:52 AM | 06/03/2017 | OC | 68-SIA FSK Level 1, 2 and 3 | Enabled | Enabled | 75 |
| 9995500006 | 30/01/2017 9:53 AM | 06/03/2017 5:44 PM | 23 | 54-4/2 Pulse | Disabled | Disabled | 75 |
| 9995500007 | 30/01/2017 9:53 AM | 06/03/2017 5:44 PM | 14 | 16-Contact ID (4-Digit Acco... | Disabled | Disabled | 73 |
| 9995500008 | 30/01/2017 9:54 AM | 06/03/2017 5:44 PM | OC | 68-SIA FSK Level 1, 2 and 3 | Disabled | Disabled | 75 |

502 504 506 508 510 512 514 516

AUTOMATIC HANDSHAKING TO IMPROVE CALL PROCESSING AND PERFORMANCE

FIELD OF THE INVENTION

Embodiments generally relate to the field of remote monitoring systems. More particularly, embodiments relate to handshaking techniques between a central monitoring station (CMS) and a remote alarm panel that provide reliable and expedited call processing.

DISCUSSION OF RELATED ART

Typical monitoring systems often include a central monitoring station (CMS) connected to multiple alarm panels located at remote premises. The alarm panels may operate according to a variety of different communication protocols. Initial handshaking operations used to establish communications with the CMS can vary with each alarm panel. Further, the formatting of data signals transmitted to the CMS by the alarm panels can also vary significantly.

Conventionally, to establish initial communications, the CMS transmits a series of different handshake signals to determine the appropriate handshake signal for a particular alarm panel. Once communications are established, the CMS steps through a series of different decoding techniques to determine the appropriate decoding technique for processing data signals transmitted by the alarm panel. These conventional trial-and-error processes for establishing communications with a remote alarm panel and determining a data formatting used by the alarm panel are time-consuming and inefficient.

In view of the foregoing, there is a need for improved techniques to more quickly and efficiently establish communications with a remote alarm panel and to determine the appropriate decoding processes to use to decode data signals from the alarm panel.

SUMMARY OF THE INVENTION

Various embodiments provide techniques for a central monitoring station (CMS) of a monitoring system to establish communications with a remote alarm panel more quickly and efficiently. A signal from a remote alarm panel can be received by the CMS. The CMS can identify the remote alarm panel based on information related to the received signal. The CMS can determine if the remote alarm panel is known or unknown based on any prior interaction with the remote alarm panel. The CMS can store information regarding known remote alarm panels from prior interactions. Handshake signals and data formatting information determined from prior interactions with the known remote alarm panel can be stored and used during subsequent calls. Additional operational information related to the remote alarm panel can also be updated after each call to further customize future interactions with the remote alarm panel. Other embodiments are disclosed and described.

DESCRIPTION OF EMBODIMENTS

The present invention will now be described more fully hereinafter with reference to the accompanying drawings, in which preferred embodiments of the invention are shown. It will be appreciated, however, that the invention may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 1:
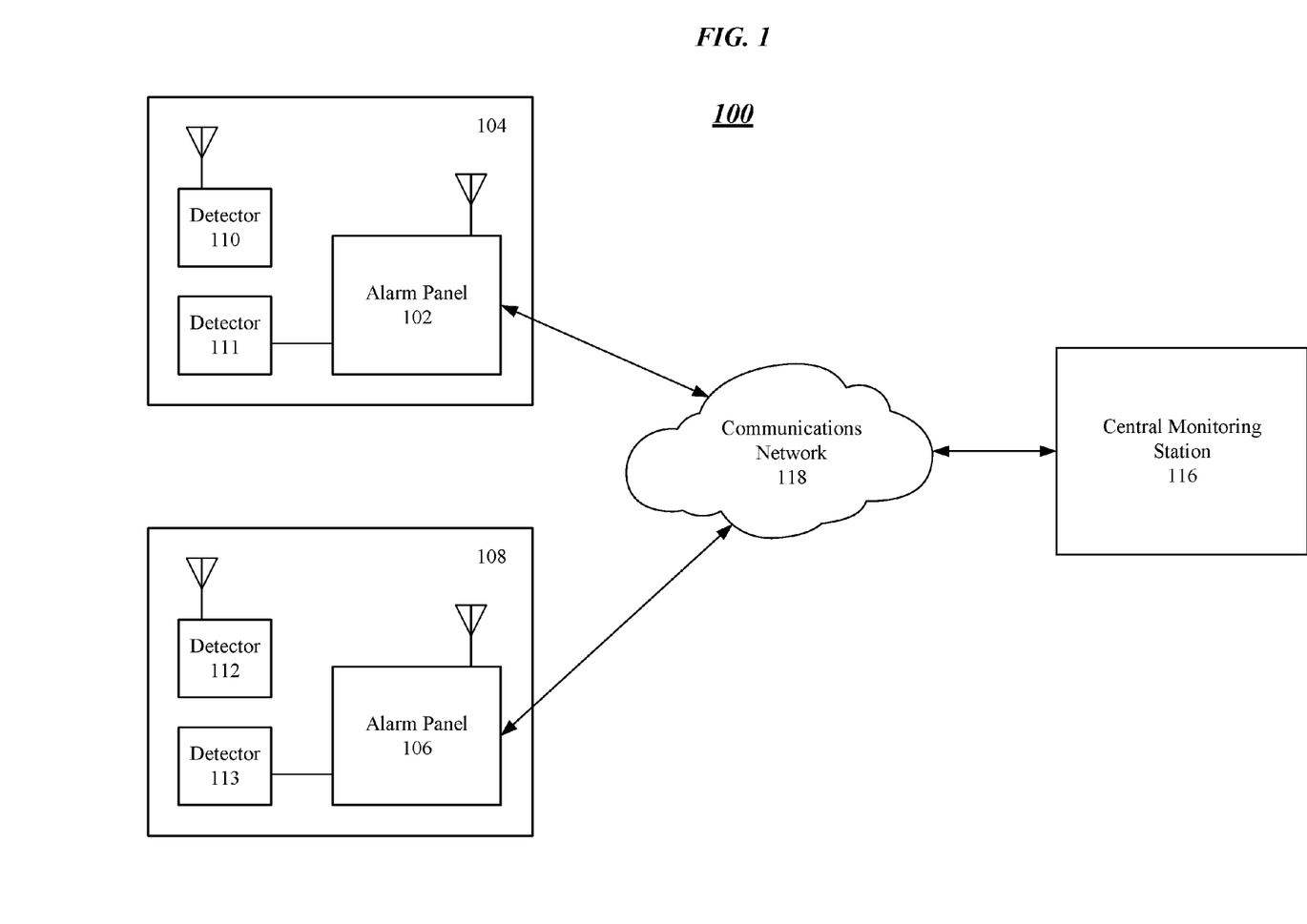
FIG. 1 illustrates an exemplary embodiment of a monitoring system.

FIG. 1 illustrates an exemplary embodiment of a monitoring system 100. The monitoring system 100 can be, for example, a security system and/or an environmental monitoring system. The monitoring system 100 can include a first alarm panel 102 located at a first customer premise 104 and a second alarm panel 106 located at a second customer premise 108. The first and second customer premises 104 and 108 can be residential or business premises.

The first alarm panel 102 can be connected to the detector 110 and the detector 112 via a wired or a wireless connection. For example, the detector 110 can be connected to the first alarm panel 102 over a wireless connection while the detector 111 can be connected to the first alarm panel 102 over a wired connection. Similarly, the second alarm panel 106 can be connected to the detector 112 and the detector 113 via a wired or a wireless connection. For example, the detector 112 can be connected to the second alarm panel 106 over a wireless connection while the detector 113 can be connected to the second alarm panel 106 over a wired connection.

The detectors 110-113 can provide information regarding a status of a monitored space. Generally, the detectors 110-113 can provide environmental and/or security monitoring of a space. For example, the detectors 110-113 can be motion detectors, glass break detectors, or contact detectors. The detectors 110-113 can also be environmental detectors including, for example, temperature detectors, smoke detectors, or gas detectors. The alarm panels 102 and 104 are each shown connected to two detectors but are not so limited. That is, the first alarm panel 102 can be connected to any number of detectors located at the first customer premise 104. Likewise, the second alarm panel 106 can be connected to any number of detectors located at the second customer premise 108. The alarm panels 102 and 104 can typically include user input and/or output devices (e.g., a keypad or a display) as well as notification systems (e.g., audible and/or visual alarms).

The alarm panels 102 and 106 can be connected to a central monitoring station (CMS) 116 over a communications network 118. The communications network 118 can include a variety of digital and analog networks that operate according to a variety of communication protocols. The communications network 118 can include portions of the public switched telephone network (PSTN) and/or portions of a cellular or other wireless network. The communications network 118 can include a variety of communication links (e.g., fiber lines and/or T1 lines) that may involve conversions of data across different data formats including voice-over-internet protocol (VoIP) communications, analog-to-digital (A/D) conversions, and packet based routing or circuit based switching.

The CMS 116 can be located remotely from the alarm panels 102 and 106 and connected to the communications network 118 to facilitate bilateral communication with the alarm panels 102 and 106. The CMS 116 is shown connected to two alarm panels but is not so limited. That is, the CMS 116 can be connected to any number of remote alarm panels. The monitoring system 100 operates to relay information about a monitored space from one of the detectors 110-113 to the CMS 116. Specifically, the detector 110 can detect a condition of a space monitored by the detector 110. The detector 110 can provide information regarding the detected condition to the first alarm panel 102 as an alarm condition. An example of a detected condition can be smoke within a monitored space. The first alarm panel 102 can communicate with the CMS 116 over the communications network 118 to report the alarm condition.

The alarm panel 102 can initiate communications with the CMS 116 by, for example, dialing a telephone number associated with the CMS 116. Once a telephone connection is established between the alarm panel 102 and the CMS 116, the alarm panel 102 can generate and send data over the communications network 118 to the CMS 116 representative of the sensed alarm condition or event. The CMS 116 can receive and process the data sent by the alarm panel 102. Based on the sensed alarm condition, the CMS 116 can choose an appropriate action or response (e.g., contacting fire department, notifying an owner of the premise 104, etc.).

The alarm panels 102 and 106 can be different types of alarm panels produced by different manufacturers. Further, the alarm panels 102 and 106 may operate differently to generate and transmit data over the communications network 118 to the CMS 116. The alarm panels 102 and 106 may operate according to different communication protocols such as, for example, Contact ID, dual-tone, multi-frequency (DTMF), or any other data modulation or coding protocol using one or more carrier signals. Accordingly, the CMS 116, when connected to a very large number of alarm panels, may be required to receive and process data signals that can be formatted according to one of a relatively large number of different communication protocols. Further, the quality and integrity of the data signals received by the CMS 116 can suffer due to complexities of the communications network 118.

Figure 2:
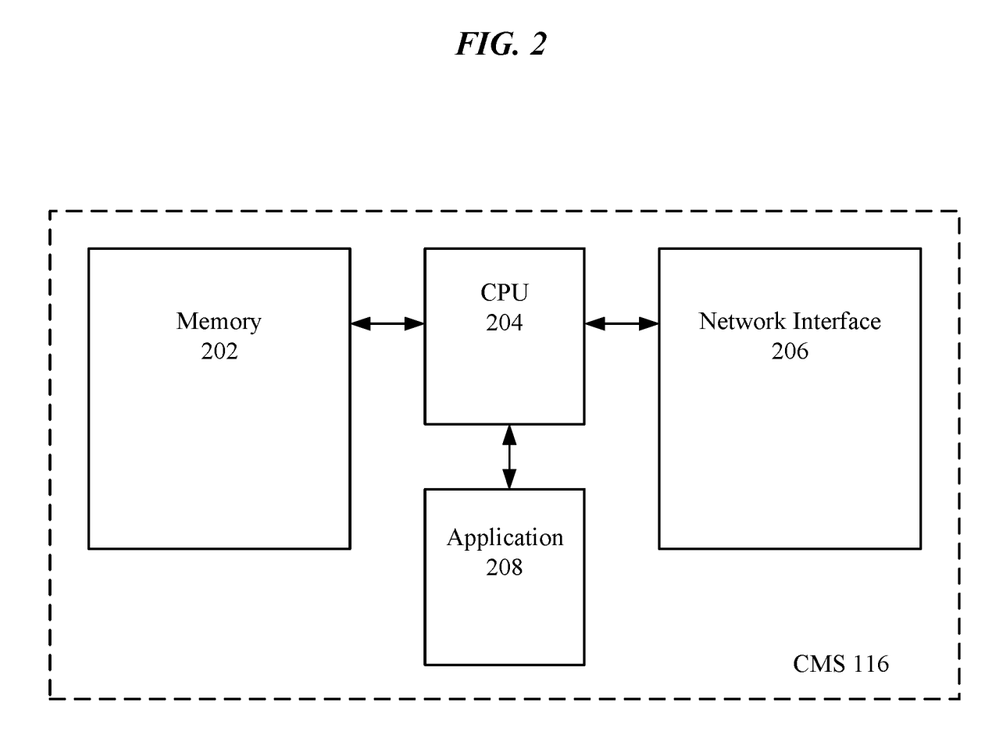
FIG. 2 illustrates an exemplary embodiment of the central monitoring station (CMS) depicted in FIG. 1.

FIG. 2 illustrates an exemplary embodiment of the CMS 116 depicted in FIG. 1. As shown in FIG. 2, the CMS 116 can include a memory component 202, a central processing unit (CPU) component or a processor component 204, a network interface component 206, and an application component 208. The processor 204 can operate as a controller for the CMS 116. The processor 204 can be communicatively coupled to the memory 202 and the network interface 206 and can control overall operation of the memory 202 and the network interface 206. The memory 202 can store operational parameters for the CMS 116 as well as information regarding the first and second alarm panels 102 and 106. The network interface 206 interfaces with the communications network 118 to transmit and receive signals to and from the alarm panels 102 and 106. The application 208 can be computer code or instructions (e.g., non-transitory machine-readable instructions stored in the memory 202 or other storage medium) operative on the processor 204. The application 208 can direct operation of the CMS 116 to receive and process data signals to determine a sensed alarm condition reported by the alarm panel 102 or the alarm panel 106.

Generally, the CMS 116 operates to communicate with the first and second alarm panels 102 and 106 to send and receive data. In particular, the CMS 116 operates to process data from the alarm panels 102 and 106 including decoding data representative of a sensed alarm condition and determining an appropriate response thereto. The CMS 116 can receive data signals from the alarm panels 102 and 106 over telephone lines. The data signals can be of a variety of forms including, for example, amplitude modulated (AM) data, quadrature amplitude modulated data signals (QAM), frequency shift keyed signals (FSK), phase shift keyed signals (PSK), Contact ID signals, and DTMF modulated data signals. The data signals can be formatted to include one or bits of data. The data signals can be indicative of the sensed alarm condition and can be encoded. The CMS 116 can decode the data signals to determine the reported alarm condition.

To communicate with one of the alarm panels 102 or 106 (e.g., the first alarm panel 102), a connection over a telephone line can be made between the first alarm panel 102 and the CMS 116. After establishing a connection, the CMS 116 can send a handshake signal to the alarm panel 102. In response, the alarm panel 102 can send an expected reply signal to the CMS 116. This handshaking can typically involve the initial exchange of data between the alarm panel 102 and the CMS 116 to initiate a connection and to enable further successful communications.

For example, data exchanged during the handshaking process may include an indicator of the signal protocol or formatting used by the alarm panel 102 to encode its outgoing data. This can ensure that the CMS 116 is aware of the particular signaling protocol and/or data format used by the alarm panel 102 so that the CMS 116 can decode subsequent data signals transmitted by the alarm panel 102.

After a successful handshaking process, the alarm panel 102 can transmit data to the CMS 116 that is representative of a sensed alarm condition. The CMS 116 can receive and process these data signals. The data signals are decoded to determine the reported alarm condition. The CMS 116 can then determine an appropriate response for the reported alarm condition. After a successful handshaking process and/or after successfully decoding data signals received from the alarm panel 102, the CMS 116 can provide an indication to the alarm panel 102 that communications are established/or have been successful. The indication can be in the form of a transmitted acknowledgement single from the CMS 116 to the alarm panel 102, which can be referred to as a kiss-off.

Figure 3:
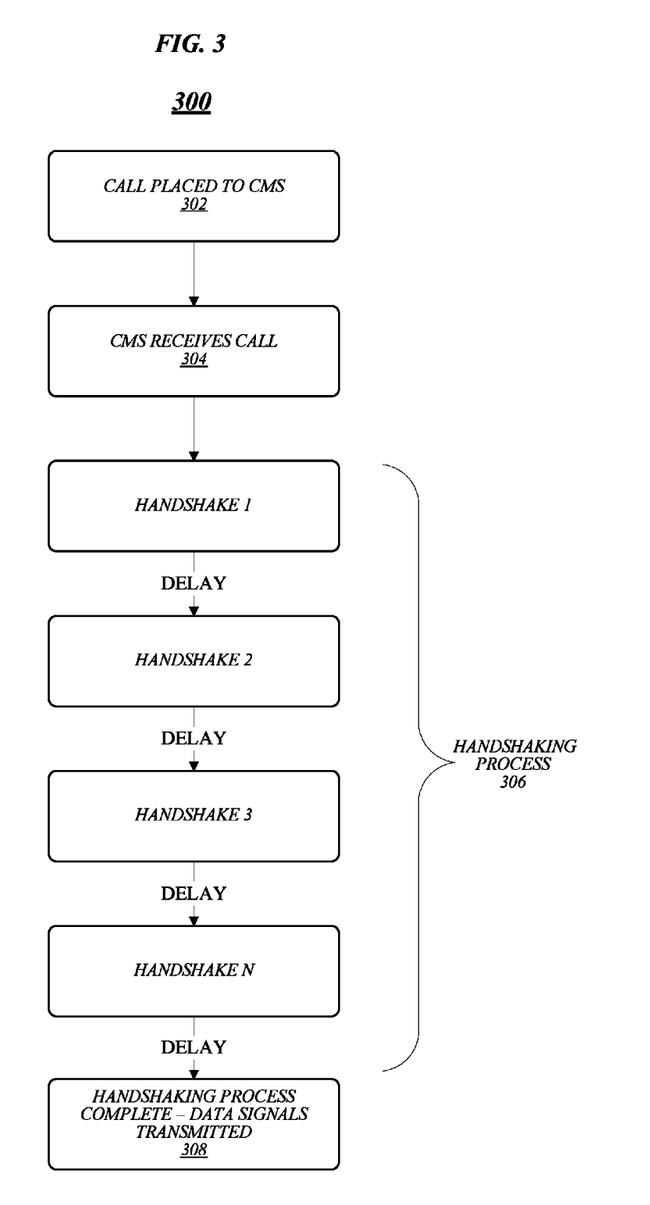
FIG. 3 illustrates a first logic flow.

FIG. 3 illustrates a logic flow 300 for initiating communications between an alarm panel (e.g., the first alarm panel 102) and a CMS (e.g., the CMS 116). The logic flow 300 may be representative of operations executed by the alarm panel 102 and the CMS 116 to establish communications between the alarm panel 102 and the CMS 116. At 302, the alarm panel 102 contacts the CMS 116. The alarm panel 102 can contact the CMS 116 by sending a signal over the communications network 118. As an example, the alarm panel 102 can contact the CMS 116 by placing a call over a telephone line using a telephone number associated with the CMS 116.

At 304, the CMS 116 receives the signal from the alarm panel 102. As an example, the CMS 116 can receive an incoming call over a telephone line from the alarm panel 102. The CMS 116 implements a HANDSHAKING sequence 306. As discussed above, to establish reliable communications with the alarm panel 102, the CMS 116 can first implement a handshaking process to determine the signal protocols and data formatting used by the alarm panel 102. Generally, the alarm panel 102 will respond to a certain handshaking signal and will ignore all other handshaking signals. Without knowledge of what handshaking signal the alarm panel 102 will respond to, the CMS 116 can send a sequence of different handshaking signals. The CMS 116 can wait a predetermined amount of time after sending each handshaking signal for an expected reply from the alarm panel 102. If the expected reply is not received, then the CMS 116 can send the next handshaking signal in the sequence.

This process can be repeated until the expected reply is received from the alarm panel 102. As shown in FIG. 3, the CMS 116 can step through multiple different handshaking signals (shown as HANDSHAKES 1 to N in FIG. 3) in a predetermined order. The predetermined amount of time that the CMS 116 waits after each transmission is represented as a delay in FIG. 3. After completing the HANDSHAKING sequence 306, data signals can be transmitted by the alarm panel 102 to the CMS 116 at 308.

Without knowledge of which handshake signal is the correct handshake signal for the alarm panel 102, the CMS 116 must step through each handshake signal sequentially until the correct one is identified (e.g., by receiving an expected response thereto from the alarm panel 102). The CMS 116 can therefore be required to step through any number of handshake signals, accumulating significant periods of delay. The total amount of time to complete the handshaking process successfully can be significant, as a delay of several seconds (e.g., approximately 4 seconds) can be associated with each attempted handshake signal. As a result, the HANDSHAKING sequence 306 can take up a significant amount of time while also occupying resources that cannot be used to answer calls from other remote alarm panels. Further, the HANDSHAKING sequence 306 may be repeated for each subsequent call from the alarm panel 102 to the CMS 116, or for any other remote alarm panel that attempts a call to the CMS 116.

Figure 4:
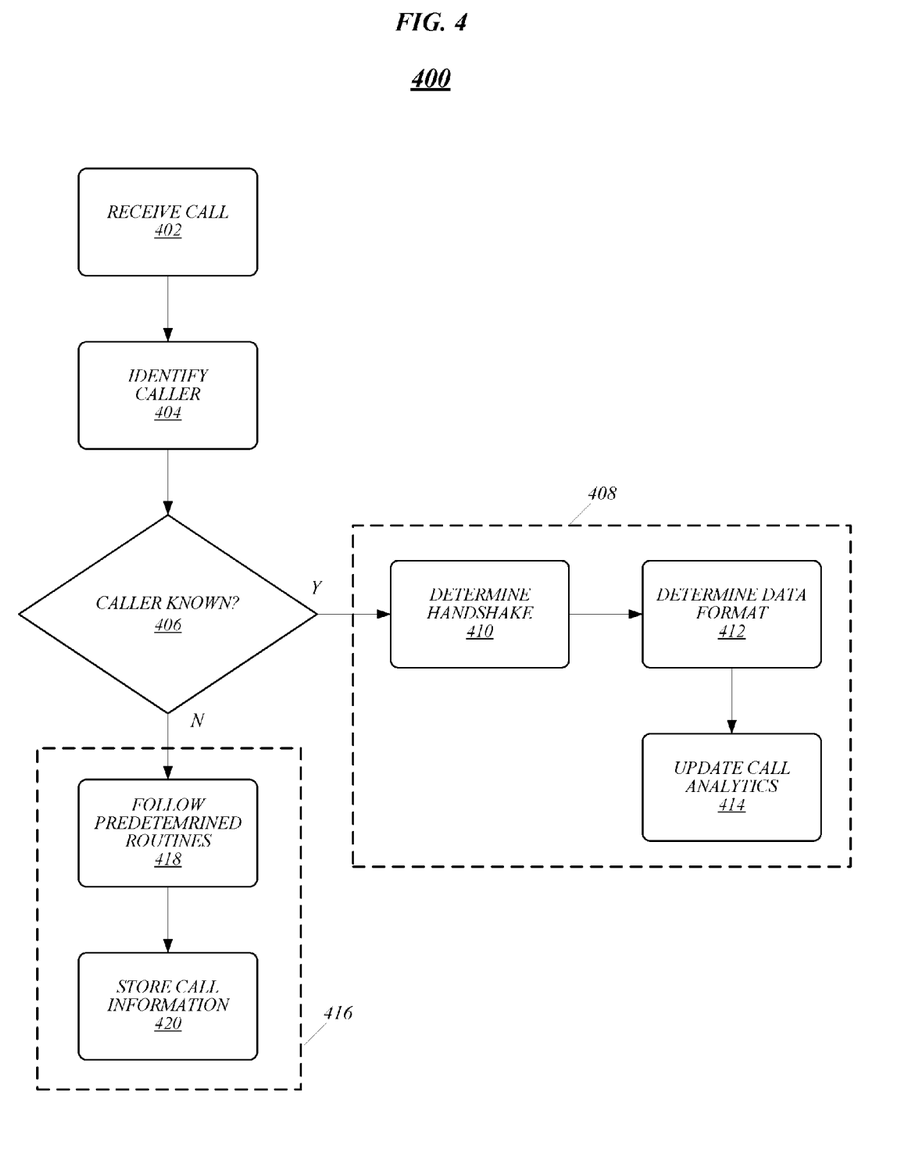
FIG. 4 illustrates a second logic flow.

FIG. 4 illustrates a logic flow 400 for implementing an automatic handshake (AHS) between an alarm panel (e.g., the alarm panel 102) and a CMS (e.g., the CMS 116). The logic flow 400 may be representative of the operations executed by the CMS 116 when the CMS 116 receives a call from the alarm panel 102. At 402, the CMS 116 can receive a call from the alarm panel 102. The call can be received over a telephone line. The call can be a signal transmitted over the communications network 118.

At 404, the CMS 116 can determine caller information based on the received call. Specifically, the CMS 116 can determine which particular remote alarm panel placed the call to the CMS 116. The identity of the alarm panel 102 can be determined, for example, based on caller identification (ID) information, automatic number identification (ANI) information, or dialed number identification service (DNIS) provided as part of the call or signal.

At 406, the CMS 116 can determine if the call is from a remote alarm panel that has called in previously. The CMS 116 can generate and store an automatic handshake table (e.g., in the memory 202) that includes information for "known" remote alarm panels. For example, the table can include identification information for a remote alarm panel (e.g., caller ID information). If the call originates from an alarm panel that has called in previously, the table can indicate as much. Further, additional information regarding a specific alarm panel can also be stored such as, for example, a last call time and a last call duration. In this way, the CMS 116 can determine at 406 if the remote alarm panel is a known alarm panel—e.g., an alarm panel that has called in previously and/or an alarm panel having information stored in the automatic handshaking table—or an unknown alarm panel—e.g., an alarm panel for which the CMS 116 has not interacted with previously.

If the call is from a known alarm panel, then the CMS 116 can implement the further process 408. The known call process 408 can begin at 410 with the CMS 116 determining the handshake signal to use with the identified alarm panel. Based on prior interaction with the identified alarm panel, a handshake signal previously successfully used with the identified alarm panel can be determined. For example, the automatic handshake table can include an entry corresponding to the identified alarm panel that specifies the handshake signal to send to the alarm panel. The handshake signal can be the handshake signal used in a prior call with the alarm panel.

By identifying the correct handshake signal to use with the identified alarm panel, the CMS 116 can immediately send the handshake signal to the alarm panel without having to step through a predetermined sequence of handshakes to test for the correct handshake. As a result, the handshaking process between the CMS 116 and the identified alarm panel can occur more quickly and efficiently. In response to the handshake signal sent by the CMS at 410, the remote alarm panel can transmit an expected signal that is received by the CMS 116.

At 412, the CMS 116 can determine a communication format associated with the identified alarm panel. Specifically, the CMS 116 can determine how data sent by the alarm panel will be formatted in terms of, for example, frequency, number of tones, signal duration, modulation scheme, compression scheme, and/or signal levels, as well as a variety of other characteristics regarding data formatting. Information regarding the data format associated with a particular alarm panel can also be stored in the automatic handshake table. The information relating to data formatting can be based on prior calls with the alarm panel during which particular characteristics of the data format used by a specific alarm panel can be determined.

At 414, the call can be ended. The CMS 116 can store any updated information related to the alarm panel such as additional details on data formatting or analytic call information such as call duration, call type, etc.

If the call to the CMS 116 is from an unknown alarm panel (e.g., a panel that has not called in before or for which the CMS 116 does not have any information stored in the automatic handshake table), then the CMS 116 can implement the process 416 for handling a "new" call.

At 418, the CMS 116 can follow predetermined routines and settings for handling a new call. As part of this process, the CMS 116 can implement portions of the logic flow 300 (e.g., HANDSHAKING process 306) to first determine a handshake signal for the alarm panel. After the correct handshake signal is provided, the CMS 116 can next perform a sequence of steps to determine a data formatting used by the alarm panel. Determining the data format used by the alarm panel can take a number of additional time-consuming steps including decoding one or more data signals from the alarm panel several different ways and sending acknowledgement or non-acknowledgement signals back to the alarm panel.

Once the CMS 116 determines the handshake and data formatting associated with the alarm panel, the CMS 116 can complete the call with the alarm panel by successfully decoding data signals from the alarm panel. The additional steps of sequencing through a series of handshakes and implementing procedures to verify the data formatting used can introduce significant increases to call processing time, particularly in comparison to the process 408 implemented for a known alarm panel.

Once the call is completed, the CMS 116 can store call information at 420 in the automatic handshake table. Specifically, the CMS 116 can store data relating to the handshake signal used with the alarm panel as well as information relating to the data formatting used by the alarm panel. Further, the CMS 116 can store information regarding settings and or processes it used to successfully decode data signals from the alarm panel. As a result, the next time the alarm panel calls in, the CMS 116 can implement the process 408 and can handle the call more quickly and efficiently based on stored handshake information and stored data formatting information.

Figure 5:
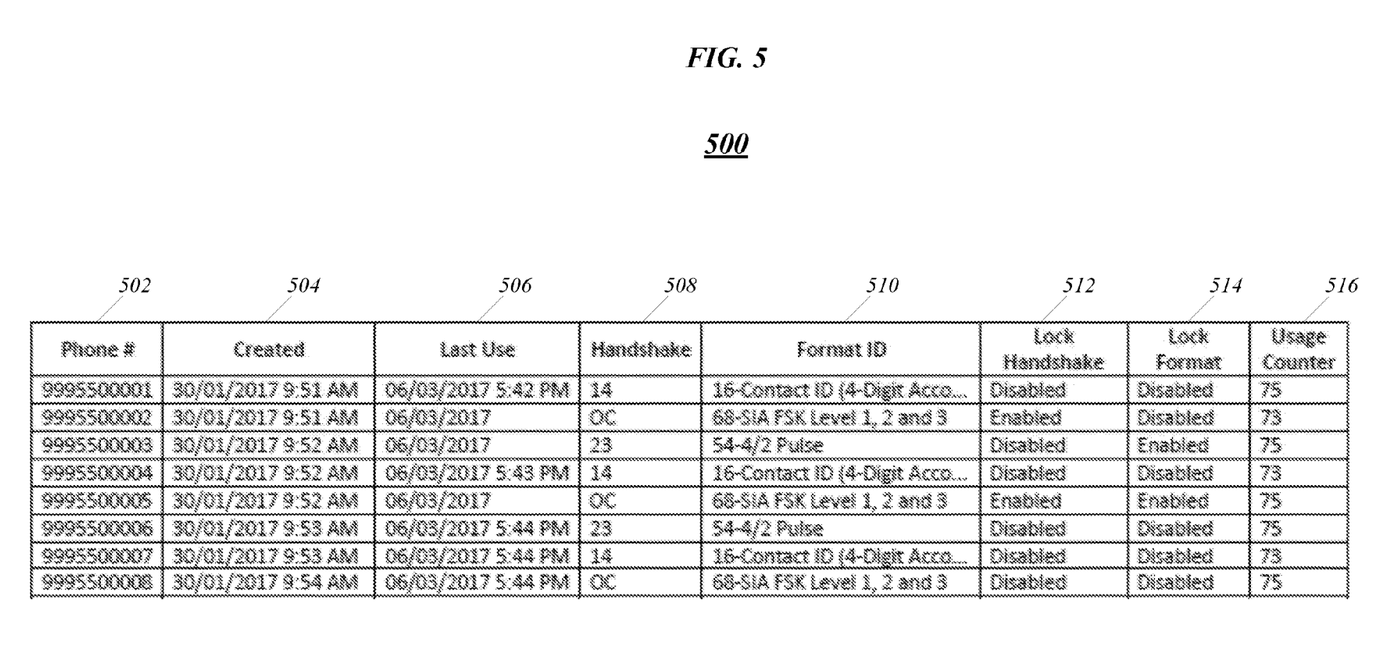
FIG. 5 illustrates an automatic handshaking table according to an embodiment.

FIG. 5 illustrates an exemplary automatic handshake (AHS) table 500. The AHS table 500 can be generated by the processor 204 as directed by the application 208 and can be stored in the memory 202. The AHS table 500 can be used to store and lookup information regarding a particular remote alarm panel to expedite call processing. The AHS table 500 can be used by the CMS 116 during implementation of the logic flow 400. The AHS table 500, for example, can include information regarding the alarm panels 102 and 106.

As shown in FIG. 5, the AHS table 500 can include a phone number column 502 which can be used to identify an alarm panel. For example, phone number column 502 can store a phone number associated with the alarm panel. Column 504 can be used to specify when a particular entry for an alarm panel was created. Colum 506 can be used to specify a last time an entry for a particular alarm panel was used by the CMS 116.

Handshake column 508 can store handshake information for a particular alarm panel. Specifically, handshake column 508 can include a handshake code corresponding to a particular handshake signal to which the alarm panel is receptive. The CMS 116 can use the code stored in the handshake column 508 to determine the handshake signal that is to be sent to the alarm panel corresponding to the identification information stored in column 502.

Format ID column 510 can store data formatting information for a particular alarm panel. Specifically, format ID column 510 can include codes and/or information indicating a type of data formatting used by the alarm panel to encode and transmit data to the CMS 116. The CMS 116 can use the codes and/or information stored in column 510 to determine how to decode data received from the alarm panel that corresponds to the identification information stored in column 502.

Lock handshake column 512 can indicate whether the corresponding handshake information stored in column 508 is locked. When column 512 is enabled, then the handshake information in column 508 cannot be changed. Specifically, if an entry in column 512 is enabled, then the AHS table 500 will not accept updates to the handshake field in column 508. This allows the handshake information in column 508 to be locked to a specific code. When column 512 is disabled, then the handshake information in column 508 can be changed—for example, during or after a next call with the alarm panel.

Lock format column 514 can indicate whether the corresponding data formatting information stored in column 510 is locked. When column 514 is enabled, then the CMS 116 will only accept and process data from the alarm panel when formatted according to the information stored in column 510. Specifically, if an entry in column 514 is enabled, then the CMS 116 will only process data formatted according to the stored data formatting information in column 510. Accordingly, data signals that are received that are formatted differently from the expected data formatting can be ignored and not decoded or processed.

If the entry for lock format column 514 is disabled, then the CMS 116 can implement processes to determine a data formatting used by the alarm panel. However, if the lock format entry in column 514 is enabled for a particular alarm panel and the CMS 116 receives data from the alarm panel in a different format, then the CMS 116 will not process the call. Specifically, the CMS 116 will ignore the call, forcing the alarm panel to call back in.

Column 516 can represent a usage counter, indicating a number of times information stored in the AHS table 500 for a particular alarm panel has been accessed or used.

The lock handshake column 512 and the lock format column 514 can be manually set and/or can be automatically set by the processor 204 in accordance with the application 208. In various embodiments, an entry in the lock handshake column 512 can be enabled when it is certain or very likely that the alarm panel will always respond to a certain handshake signal. This determination can be made after repeated interaction with the alarm panel.

Further, in various embodiments, an entry in the lock format column 514 can be enabled when it is certain or very likely that the alarm panel will always send data according to the specified format. This determination can be made after repeated interaction with the alarm panel. Further, the information stored in the format ID column 510 can become more specific after each interaction with the alarm panel. That is, each interaction between the CMS 116 and the alarm panel enables the CMS 116 to determine with greater specificity the exact formatting used by the alarm panel and the signal processing techniques that can be used by the CMS 116 to decode the formatted data. This enables the CMS 116 to fine tune the information in the column 510—over time, this information can be customized for each individual alarm panel. Various alarm panels may generally use the same data formatting but may communicate over different pathways to the CMS 116. As a result, decoding techniques used by the CMS 116 on similarly formatted data can vary due to different channel characteristics. Accordingly, the AHS table 500 enables the CMS 116 to store customized data formatting and decoding/processing information to enable quicker and more efficient call handling.

The AHS table 500 can include additional information or functions to store for the alarm panels, including, for example:

Fault call counter—a record of the number of calls from an alarm panel where the signal was not successfully received by the CMS 116;

Last call status—a record of the last call state (e.g., did a successful kiss-off occur or did a call fault occur);

On-line time—a record of a total amount of on-line time for an alarm panel;

Compression technique used—a record of which compression technique is used by an alarm panel (e.g., if multiple compression methods are available);

Routing information—a record of the origin of a call, number of hops, latency, etc. (e.g., in a Session Initiation Protocol (SIP));

Filters used—a record of use of echo cancelers, voice cancelers, etc.;

Receiver loudness—a record of handshake kiss-off amplitude to be used by the CMS 116 for a particular alarm panel;

Receiver sensitivity—a record indicating sensitivity of the alarm panel receiver; and Format library—a record of possible protocols that can be or have been used by an alarm panel.

Call information or information related to an alarm panel stored in the automatic handshaking table 500 can be retrieved from the memory 202 on a next call from the alarm panel. The stored information, as described above, can also include information regarding the type of signal formatting and signal levels to be used by the CMS 116 when generating signals for transmission to the remote alarm panel (e.g., during kiss-off). In general, the automatic handshaking table 500 can store information regarding which algorithms, including error-handling algorithms, for establishing communications and/or decoding data signals from the alarm panel were successful on any prior call. Such algorithms can then be given priority on a next call to improve call processing times and reception performance. Further, failed algorithms or techniques from a prior call can also be logged, so that the failed algorithms are not re-used on subsequent calls. Further, logging failed algorithms or techniques provides tracking for identifying a next reception technique to attempt on a next call from the alarm panel.

The techniques disclosed herein can be applied repeatedly on each call from an alarm panel such that, over time, information stored relating to each alarm panel can become more specific and therefore customized to a particular alarm panel. In turn, call processing can be expedited and can be more reliable. Further, resources of the CMS 116 can be conserved resulting in shorter call durations and reduced failed calls and retry attempts.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method for establishing communications between a remote alarm panel and a central monitoring station over a communications network, comprising:
   receiving a signal from the remote alarm panel;
   identifying the remote alarm panel based on the received signal;
   determining whether the remote alarm panel is known;
   for a known remote alarm panel:
      determining an automatic handshaking signal based on a handshaking code stored at the central monitoring station, the handshaking code stored from a prior communication between the remote alarm panel and the central monitoring station,
      transmitting the automatic handshaking signal to the remote alarm panell, and
      receiving an expected response from the remote alarm panel; and for an unknown remote alarm panel:
      transmitting a sequence of different handshaking signals to the remote alarm panel until the expected response signal is received from the remote alarm panel.

2. The method of claim 1, further comprising identifying the remote alarm panel based on at least one of caller identification (ID) information, automatic number identification (ANI) information, and dialed number identification service (DNIS) information.

3. The method of claim 1, wherein the automatic handshaking signal is stored in an automatic handshake table.

4. The method of claim 3, further comprising determining a data formatting associated with the remote alarm panel based on data format information stored in the automatic handshake table for the remote alarm panel.

5. The method of claim 4, further comprising decoding data signals from the remote alarm panel based on the determined data formatting associated with the remote alarm panel.

6. The method of claim 4, further comprising ignoring data signals received from the remote alarm panel that are formatted differently from the determined data formatting associated with the remote alarm panel.

7. The method of claim 4, wherein the handshaking code and the data format information stored in the automatic handshaking table for the remote alarm panel are based on a prior interaction between the central monitoring station and the remote alarm panel.

8. The method of claim 7, further comprising updating the handshaking code and the data format information stored in the automatic handshaking table based on the established communications between the central monitoring station and the remote alarm panel.

9. The method of claim 3, further comprising, for the unknown remote alarm panel, storing a handshaking code and data formatting information for the unknown remote alarm panel in the automatic handshake table.

10. The method of claim 9, wherein the handshaking code for the unknown remote alarm panel corresponds to the handshaking signal transmitted immediately prior to reception of the expected response signal.

11. A component for establishing communications with a remote alarm panel over a communications network, the component comprising:
   a network interface for receiving signals from the remote alarm panel and sending signals to the remote alarm panel over the communications network;
   an application operative on a processor component and communicatively coupled with the network interface; and
   a memory operative to store information pertaining to known remote alarm panels;
   the application operative to:
      receive a signal from the remote alarm panel;
      identify the remote alarm panel based on the received signal;
      determine whether the remote alarm panel is known;
      for a known remote alarm panel:
         determine an automatic handshaking signal based on a handshaking code stored at the central monitoring station, the handshaking code stored from a prior communication between the remote alarm panel and the central monitoring station,
         transmit the automatic handshaking signal to the remote alarm panel, and
         receive an expected response from the remote alarm panel; and for an unknown remote alarm panel:
         transmit a sequence of different handshaking signals to the remote alarm panel until the expected response signal is received from the remote alarm panel.

12. The component of claim 11, wherein the automatic handshaking signal is stored in an automatic handshake table.

13. The component of claim 12, wherein the application, for the unknown remote alarm panel, is operative to store a handshaking code and data formatting information for the unknown remote alarm panel in the automatic handshake table.

14. The component of claim 13, wherein the handshaking code for the unknown remote alarm panel corresponds to the handshaking signal transmitted immediately prior to reception of the expected response signal.

15. The component of claim 12, wherein the application is further operative to determine a data formatting associated with the remote alarm panel based on data format information stored in the automatic handshake table for the remote alarm panel.

16. The component of claim 15, wherein the application is further operative to decode data signals from the remote alarm panel based on the determined data formatting associated with the remote alarm panel.

17. The component of claim 15, wherein the application is further operative to ignore data signals received from the remote alarm panel that are formatted differently from the determined data formatting associated with the remote alarm panel.

18. The component of claim 15, wherein the handshaking code and the data format information stored in the automatic handshaking table for the remote alarm panel are based on a prior interaction between the central monitoring station and the remote alarm panel.

\* \* \* \* \*